Figure 1:
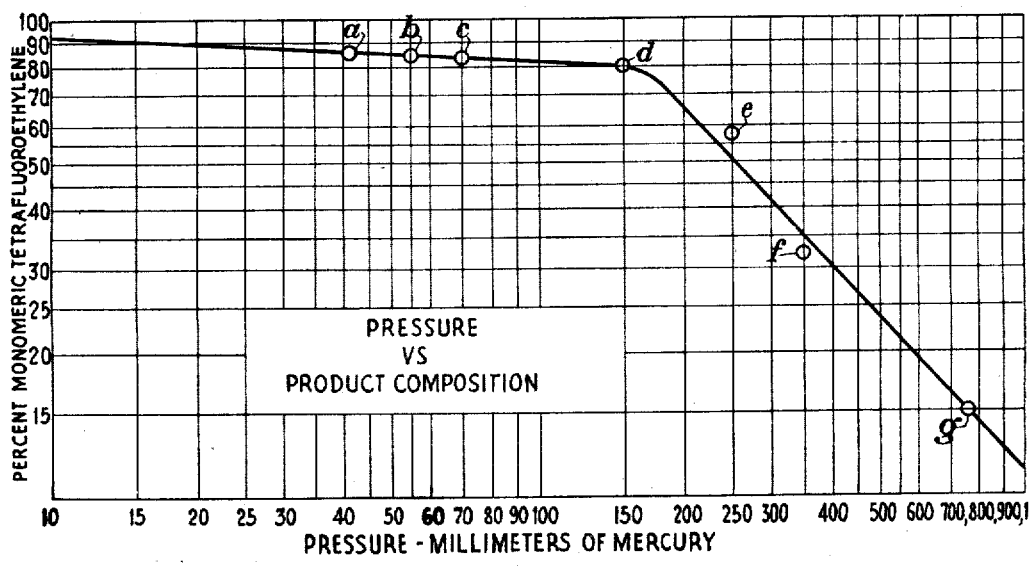

Aug. 20, 1946.  E. E. LEWIS  2,406,153

DEPOLYMERIZATION OF POLYMERIC TETRAFLUOROETHYLENE

Filed June 23, 1944

Ernest E. Lewis  INVENTOR.

BY

ATTORNEY

Patented Aug. 20, 1946

2,406,153

UNITED STATES PATENT OFFICE 2,406,153

DEPOLYMERIZATION OF POLYMERIC TETRAFLUOROETHYLENE

Ernest E. Lewis, Lyndhurst, N. J., assignor to E. I. du Pont de Nemours & Company, Wilmington, Del., a corporation of Delaware Application June 23, 1944, Serial No. 541,821

5 Claims. (Cl. 260—653)

This invention relates to the depolymerization of polymeric tetrafluoroethylene and, more particularly, to a process of depolymerizing polymeric tetrafluoroethylene under conditions to yield a high proportion of monomeric tetrafluoroethylene.

Polymeric tetrafluoroethylene has been subjected heretofore to pyrolysis under varying conditions whereby a number of products have been obtained including monomeric tetrafluoroethylene, hexafluorocyclopropane having the formula $C_3F_6$, octafluorocyclobutane having the formula $C_4F_8$, and certain polymeric products having relatively low melting points. The proportion of monomeric tetrafluoroethylene recovered has been relatively low, usually considerably less than 50% by weight of the polymer pyrolyzed and, hence, the heretofore known procedures have not been satisfactory for commercial recovery of monomeric tetrafluoroethylene from scrap polymer.

An object of the present invention is to provide an economical process for the recovery of monomeric tetrafluoroethylene from polymeric tetrafluoroethylene. A further object is to provide a process of depolymerizing polymeric tetrafluoroethylene to obtain a high yield of monomeric tetrafluoroethylene. Other objects will be apparent from the description of the invention given hereinafter.

The above objects are accomplished according to the present invention by heating polymeric tetrafluoroethylene at a temperature above its decomposition point under a reduced pressure not exceeding about 150 millimeters of mercury and collecting the monomeric tetrafluoroethylene thereby produced.

The present invention resides in large part in the discovery that the pressure at which the decomposition of the polymeric tetrafluoroethylene is carried out, profoundly influences the composition of the depolymerization products obtained and, unexpectedly, that the proportion of monomeric tetrafluoroethylene in the recovered gases is exceedingly high when the depolymerization is carried out at pressures less than about 150 millimeters of mercury although the proportion of monomeric tetrafluoroethylene rapidly decreases as the pressure is increased beyond about 150 millimeters. It has further been found that other conditions may be varied widely without effecting any radical change in the composition of the recovered gases but certain steps may be taken to improve the efficiency of the process with respect to yield of monomeric tetrafluoroethylene based on weight of the polymer treated.

The decomposition of the polymeric tetrafluoroethylene may be conveniently carried out in a reaction tube of iron or other material substantially inert to the reaction and the reaction products. The tube may be heated conveniently by means of electric coils although other means may be employed. The products of decomposition are then passed first through a trap for solids and the gases are then led into a receiver maintained at a low temperature by a dry ice-methanol bath or the like where the gases may be condensed. A considerable amount of the polymer charged into the reaction tube tends to collect in the cool part of the exit end of the tube but this may be conveniently prevented by placing one or more 2- or 3-inch rolled up cylinders of galvanized iron window screening or similar inert material which, preferably, is a good conductor for heat, in the reaction tube toward the exit end thereof and heating the tube at that point to above the decomposition point of the polymer. This also tends to prevent the formation of a white sublimate of undetermined composition although at the reduced pressures of the present invention, the tendency to form this sublimate is greatly reduced in any event.

The decomposition point of the polymeric tetrafluoroethylene may vary somewhat with different samples but in general the polymer commences decomposing at about 550° C. and heating the decomposition tube or chamber to a temperature of 600° C.–700° C. is preferred. There is no great difference in the proportion of monomeric tetrafluoroethylene recovered through the temperature range of 600° C. to 700° C. or even at as high as 800° C., a slight tendency toward decreased yields being noted as the temperature is advanced. If the section of the reaction tube in which the rolled up screening is placed, is heated to as high as 800° C. the formation of the sublimate is substantially completely stopped but even at a temperature of 600° C. the amount of sublimate formed is no appreciable factor.

While neither substantial variations in the temperature to which the reaction tube is heated nor the temperature to which the screening is heated within the reaction tube, materially affects the proportion of tetrafluoroethylene recovered, reducing the pressure in the decomposition chamber does affect the composition of the recovered gases greatly. The drawing forming a part of this application shows in the single figure thereof a curve which illustrates this clearly.

In Fig 1, the curve shown is laid out on logarithmic graph paper and indicates the relation between the composition of the gases recovered in the depolymerization of polymeric tetrafluoroethylene and the pressure employed. The pressure in millimeters of mercury is given along the abscissa and the percent of monomeric tetrafluoroethylene, by weight of the total recovered gases, is given along the ordinate. At points $a$, $b$, and $c$ where the pressure in the reaction tube varied from 40 to 70 millimeters of mercury, the monomeric tetrafluoroethylene in the recovered gases is well above 80% and even at point $d$, 150 millimeters of mercury pressure, the yield is approximately 80%. But when the pressure is increased to 250 millimeters of mercury, point $e$, there is a sharp break in the composition with the monomeric tetrafluoroethylene dropping to below 60% and continuing to drop at about the same rate at pressures of 350 millimeters, point $f$, and 760 millimeters, point $g$, which is atmospheric pressure. The recovered gases show only aproximately 15% monomeric tetrafluoroethylene at atmospheric pressure.

The sharp break in the curve in Fig. 1 beyond the point $d$ corresponds with a distinct change in the composition of the recovered gases in that, at pressures below 150 millimeters of mercury the recovered gases consisted of monomeric tetrafluoroethylene and hexafluorocyclopropane as far as analyses show, no octafluorocyclobutane being found although it might have been present in traces. On the other hand, employing pressures about 150 millimeters of mercury, octafluorocyclobutane was found in the recovered gases in all runs and rapidly increased as the pressure increased above 150 millimeters. Since the composition of the recovered gases was analyzed in each instance by distillation and there was some doubt about the last 4% of the product to be distilled, it is recognized that there is the possibility of an error, not exceeding 3.3% total error, which, however, would not materially affect the validity of the findings above.

The following examples, in which all proportions are given by weight unless otherwise noted, illustrate specific embodiments of the invention:

Example I

Polymeric tetrafluoroethylene subdivided to pass through a $\frac{1}{16}$ in. screen, was introduced into a reaction chamber consisting of a 27½ in. section of ¾ in. pipe provided with three electrical resistance coils for heating, the pipe extending about 1 ft. beyond the coils at both ends and a cylinder of rolled up galvanized iron window screening of 30-mesh being positioned in the section of the pipe heated by the third resistance coil. The cylinder of wire screening was aproximately 2½ in. long and the cylinder walls consisted of double thicknesses of the screening while one end of the cylinder was closed with a single thickness of the screening. The pipe forming the reaction tube was heated to about 600° C. by each resistance coil and the products of depolymerization were first passed through two vacuum flasks filled with glass wool to trap solids and the gases were then collected in cylinders cooled by a dry ice-methanol mixture.

During the run a uniform pressure of 41 millimeters of mercury was maintained in the reaction tube and the collected gases showed the following analysis:

|  | Percent |
|---|---|
| $C_2F_4$ | 85.7 |
| $C_3F_6$ | 14.3 |

A second run was carried out as above but a temperature of 700° C. was maintained in the sections of the reaction tube heated by the first two resistance coils. The collected gases showed the following analysis:

|  | Percent |
|---|---|
| $C_2F_4$ | 82.1 |
| $C_3F_6$ | 17.9 |

Example II

Three runs were carried out substantially as in the first run of Example I except that pressures of 55 millimeters, 70 millimeters, and 150 millimeters of mercury were maintained, with the following results:

| Pressure, millimeters of mercury | Analysis of collected gases | | |
|---|---|---|---|
|  | $C_2F_4$ | $C_3F_6$ | $C_4F_8$ |
|  | Percent | Percent | Percent |
| 55 | 84.1 | 15.3 |  |
| 70 | 83.0 | 17.0 |  |
| 150 | 80.3 | 14.5 | 5.2 |

The proportion of monomeric tetrafluoroethylene in the collected gases remained above 80% in each instance but no octafluorocyclobutane was detected except in the run at 150 millimeters pressure where 52% was found by analysis.

A run under substantially identical conditions but at a pressure of 250 millimeters of mercury showed the following analysis of the collected gases:

|  | Percent |
|---|---|
| $C_2F_4$ | 57.3 |
| $C_3F_6$ | 19.0 |
| $C_4F_8$ | 23.7 |

Further runs at still higher pressures showed a rapid decline in the proportion of monomeric tetrafluoroethylene, a typical run at atmospheric pressure showed the following analysis of collected gases:

|  | Percent |
|---|---|
| $C_2F_4$ | 14.2 |
| $C_3F_6$ | 26.0 |
| $C_4F_8$ | 59.8 |

Example III

Two runs were carried out under conditions similar to those in the first run of Example I but temperatures of 700° C. and 800° C. were maintained in the section of the reaction tube in which the cylinder of wire screening was positioned. The collected gases showed upon analysis, 86.8% of $C_2F_4$ and 82.8% of $C_2F_4$, respectively, indicating that no improvement in the percentage of monomeric tetrafluoroethylene in the collected gases results from heating the section with the wire screening to the high temperature although formation of the white sublimate is eliminated substantially entirely.

It will be understood that the above examples are merely illustrative and that the present invention broadly comprises heating polymeric tetrafluoroethylene at a temperature above its decomposition point under a reduced pressure not exceeding about 150 millimeters of mercury and collecting the monomeric tetrafluoroethylene thus formed.

Those skilled in the art will appreciate that the apparatus for carrying out the present invention may be varied widely and that the process may be run continuously, semi-continuously, or batch-wise. Although the use of a cylinder of wire screening heated to a temperature above the decomposition point of the polymer and placed in the path of travel of the decomposition products is advantageous in favoring the complete depolymerization of the polymer and preventing the formation of a sublimate, thus contributing to increased efficiency of the process and also forestalling difficulties due to solid condensates interfering with or cutting off the flow of gases through the apparatus, this expedient does not influence appreciably the proportion of tetrafluoroethylene in the collected gases.

The specific temperature to which the reaction chamber is heated, may be varied widely, providing it exceeds the decomposition point of the polymer being processed. Higher temperatures favor more rapid depolymerization of the polymer and, consequently, increased capacity for any given apparatus but this advantage must be balanced against the slightly decreased production of tetrafluoroethylene and the usual problems involved in employing higher temperatures.

The examples show that there is a no great difference in product yield with variations in pressure under 150 millimeters of mercury but a pressure of 40 millimeters to 100 millimeters of mercury is preferred due to the slightly greater yield of tetrafluoroethylene resulting therefrom. The benefits of operating the system under a very low pressure must, of course, be balanced against the increased trouble of operating at such pressures as compared to somewhat higher pressures under about 150 millimeters of mercury.

An advantage of the present invention is that it provides a practical and efficient means of recovering monomeric tetrafluoroethylene from the polymer. Specifically, the invention provides an economical means of recovering monomeric tetrafluoroethylene from scrap polymer accumulated from molding operations and the like.

As many apparently widely different embodiments of this invention may be made without departing from the spirit and scope thereof, it is to be understood that the invention is not limited to the specific embodiments thereof except as defined in the appended claims.

I claim:
1. Method of producing monomeric tetrafluoroethylene which comprises heating polymeric tetrafluoroethylene at a temperature above its decomposition point under a reduced pressure not exceeding about 150 millimeters of mercury and collecting the resulting monomeric tetrafluoroethylene gas formed.

2. Method of producing monomeric tetrafluoroethylene which comprises heating polymeric tetrafluoroethylene at a temperature of at least about 600° C. under a reduced pressure not exceeding about 150 millimeters of mercury and collecting the resulting monomeric tetrafluoroethylene gas formed.

3. Method of producing monomeric tetrafluoroethylene which comprises heating polymeric tetrafluoroethylene at a temperature of 600° C.–700° C. under a reduced pressure not exceeding about 150 millimeters of mercury and collecting the resulting monomeric tetrafluoroethylene gas formed.

4. Method of producing monomeric tetrafluoroethylene which comprises heating polymeric tetrafluoroethylene at a temperature of 600° C.–700° C. under a reduced pressure of 40 millimeters to 100 millimeters of mercury and collecting the resulting monomeric tetrafluoroethylene gas formed.

5. Method of producing monomeric tetrafluoroethylene which comprises introducing finely divided polymeric tetrafluoroethylene into a reaction tube maintained at a temperature of at least about 600° C. and under a reduced pressure not exceeding about 150 millimeters of mercury, passing the decomposition products formed through a screen of inert material maintained at a temperature of at least about 600° C., and thereafter collecting the gases resulting from the depolymerization of said polymeric tetrafluoroethylene.

ERNEST E. LEWIS.

Certificate of Correction

Patent No. 2,406,153.                                                                August 20, 1946.

ERNEST E. LEWIS

It is hereby certified that errors appear in the printed specification of the above numbered patent requiring correction as follows: Column 4, line 33, for "52%" read *5.2%*; column 5, line 26, strike out the article "*a*"; and that the said Letters Patent should be read with these corrections therein that the same may conform to the record of the case in the Patent Office.

Signed and sealed this 3rd day of December, A. D. 1946.

[SEAL]

LESLIE FRAZER,
*First Assistant Commissioner of Patents.* vention may be varied widely and that the process may be run continuously, semi-continuously, or batch-wise. Although the use of a cylinder of wire screening heated to a temperature above the decomposition point of the polymer and placed in the path of travel of the decomposition products is advantageous in favoring the complete depolymerization of the polymer and preventing the formation of a sublimate, thus contributing to increased efficiency of the process and also forestalling difficulties due to solid condensates interfering with or cutting off the flow of gases through the apparatus, this expedient does not influence appreciably the proportion of tetrafluoroethylene in the collected gases.

The specific temperature to which the reaction chamber is heated, may be varied widely, providing it exceeds the decomposition point of the polymer being processed. Higher temperatures favor more rapid depolymerization of the polymer and, consequently, increased capacity for any given apparatus but this advantage must be balanced against the slightly decreased production of tetrafluoroethylene and the usual problems involved in employing higher temperatures.

The examples show that there is a no great difference in product yield with variations in pressure under 150 millimeters of mercury but a pressure of 40 millimeters to 100 millimeters of mercury is preferred due to the slightly greater yield of tetrafluoroethylene resulting therefrom. The benefits of operating the system under a very low pressure must, of course, be balanced against the increased trouble of operating at such pressures as compared to somewhat higher pressures under about 150 millimeters of mercury.

An advantage of the present invention is that it provides a practical and efficient means of recovering monomeric tetrafluoroethylene from the polymer. Specifically, the invention provides an economical means of recovering monomeric tetrafluoroethylene from scrap polymer accumulated from molding operations and the like.

As many apparently widely different embodiments of this invention may be made without departing from the spirit and scope thereof, it is to be understood that the invention is not limited to the specific embodiments thereof except as defined in the appended claims.

I claim:
1. Method of producing monomeric tetrafluoroethylene which comprises heating polymeric tetrafluoroethylene at a temperature above its decomposition point under a reduced pressure not exceeding about 150 millimeters of mercury and collecting the resulting monomeric tetrafluoroethylene gas formed.

2. Method of producing monomeric tetrafluoroethylene which comprises heating polymeric tetrafluoroethylene at a temperature of at least about 600° C. under a reduced pressure not exceeding about 150 millimeters of mercury and collecting the resulting monomeric tetrafluoroethylene gas formed.

3. Method of producing monomeric tetrafluoroethylene which comprises heating polymeric tetrafluoroethylene at a temperature of 600° C.-700° C. under a reduced pressure not exceeding about 150 millimeters of mercury and collecting the resulting monomeric tetrafluoroethylene gas formed.

4. Method of producing monomeric tetrafluoroethylene which comprises heating polymeric tetrafluoroethylene at a temperature of 600° C.-700° C. under a reduced pressure of 40 millimeters to 100 millimeters of mercury and collecting the resulting monomeric tetrafluoroethylene gas formed.

5. Method of producing monomeric tetrafluoroethylene which comprises introducing finely divided polymeric tetrafluoroethylene into a reaction tube maintained at a temperature of at least about 600° C. and under a reduced pressure not exceeding about 150 millimeters of mercury, passing the decomposition products formed through a screen of inert material maintained at a temperature of at least about 600° C., and thereafter collecting the gases resulting from the depolymerization of said polymeric tetrafluoroethylene.

ERNEST E. LEWIS.

Certificate of Correction

Patent No. 2,406,153.

August 20, 1946.

ERNEST E. LEWIS

It is hereby certified that errors appear in the printed specification of the above numbered patent requiring correction as follows: Column 4, line 33, for "52%" read 5.2%; column 5, line 26, strike out the article "a"; and that the said Letters Patent should be read with these corrections therein that the same may conform to the record of the case in the Patent Office.

Signed and sealed this 3rd day of December, A. D. 1946.

[SEAL]

LESLIE FRAZER,
*First Assistant Commissioner of Patents.*